(12) United States Patent
Lindahl et al.

(10) Patent No.: US 7,677,458 B2
(45) Date of Patent: Mar. 16, 2010

(54) FINANCIAL TRANSACTION CARD WITH VISUAL EFFECT

(75) Inventors: Kim O. Lindahl, Golden Valley, MN (US); Ted C. Halbur, Lino Lakes, MN (US); Travis M. Robertson, St. Louis Park, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 633 days.

(21) Appl. No.: 11/645,143

(22) Filed: Dec. 22, 2006

(65) Prior Publication Data

US 2008/0149728 A1 Jun. 26, 2008

(51) Int. Cl.
*G06K 5/00* (2006.01)
*G06K 19/00* (2006.01)

(52) U.S. Cl. ........................ 235/487; 235/380

(58) Field of Classification Search .............. 235/380, 235/382, 383, 487, 486, 379, 375
See application file for complete search history.

(56) References Cited

U.S. PATENT DOCUMENTS

| | | | |
|---|---|---|---|
| 2,594,698 A | 4/1952 | Thomas | |
| 2,714,448 A | 8/1955 | Brown | |
| 3,894,756 A | 7/1975 | Ward | |
| 4,776,686 A | 10/1988 | Stanley et al. | |
| 4,789,573 A | 12/1988 | Jenkinson | |
| 4,863,026 A * | 9/1989 | Perkowski | 206/232 |
| 5,037,192 A | 8/1991 | Arad | |
| 5,110,197 A | 5/1992 | Arad | |
| D338,026 S | 8/1993 | Regensburg et al. | |
| 5,412,199 A | 5/1995 | Finkelstein et al. | |
| 5,604,548 A | 2/1997 | Kanbar | |
| D387,802 S | 12/1997 | Finkelstein et al. | |
| 6,176,430 B1 * | 1/2001 | Finkelstein et al. | 235/487 |
| D454,904 S | 3/2002 | Marcuccilli | |
| 6,390,372 B1 | 5/2002 | Waters | |
| 6,507,441 B1 * | 1/2003 | Eisenberg et al. | 359/627 |
| 6,758,936 B1 * | 7/2004 | Kiekhaefer et al. | 156/277 |
| 7,004,398 B1 | 2/2006 | Francis et al. | |

(Continued)

FOREIGN PATENT DOCUMENTS

GB 2 227 482 A 11/1994

OTHER PUBLICATIONS

Oriental Trading Company, Inc., www.orientaltradingcompany.com/application?namesp...bmatchallpartial&N=0&sd=Transparent+Kaleidoscopes, printed Nov. 28, 2006.

*Primary Examiner*—Thien M Le
(74) *Attorney, Agent, or Firm*—Griffiths & Seaton PLLC

(57) ABSTRACT

A financial transaction card includes a substrate and a visual distortion member. The substrate defines an aperture and includes an account identifier. The account identifier links the financial transaction card to at least one of a financial account and a financial record. The visual distortion member is positioned at least partially within the aperture and coupled with the substrate, and the visual distortion member is configured to distort images viewed therethrough. Methods of encouraging purchase and facilitating use of a stored-value card, and other financial transaction card embodiments are also disclosed.

19 Claims, 9 Drawing Sheets

U.S. PATENT DOCUMENTS

| | | |
|---|---|---|
| D526,012 S | 8/2006 | Dorr et al. |
| 7,117,990 B2 | 10/2006 | Sarif |
| 7,477,451 B2 * | 1/2009 | Katz .......................... 359/481 |
| 2002/0143697 A1 | 10/2002 | Gotfried |
| 2003/0219574 A1 * | 11/2003 | Tomczyk ................. 428/195.1 |
| 2004/0136293 A1 * | 7/2004 | Matos ..................... 369/53.21 |
| 2008/0218856 A1 * | 9/2008 | Saishu et al. ................ 359/464 |

* cited by examiner

US 7,677,458 B2

FINANCIAL TRANSACTION CARD WITH VISUAL EFFECT

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a financial transaction card including a substrate and a visual distortion member. The substrate defines an aperture and includes an account identifier. The account identifier links the financial transaction card to at least one of a financial account and a financial record. The visual distortion member is positioned at least partially within the aperture and coupled with the substrate. The visual distortion member is configured to distort images viewed therethrough. Method of encouraging purchase and facilitating use if a stored-value card, and other stored-value or financial transaction card embodiments are also disclosed. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
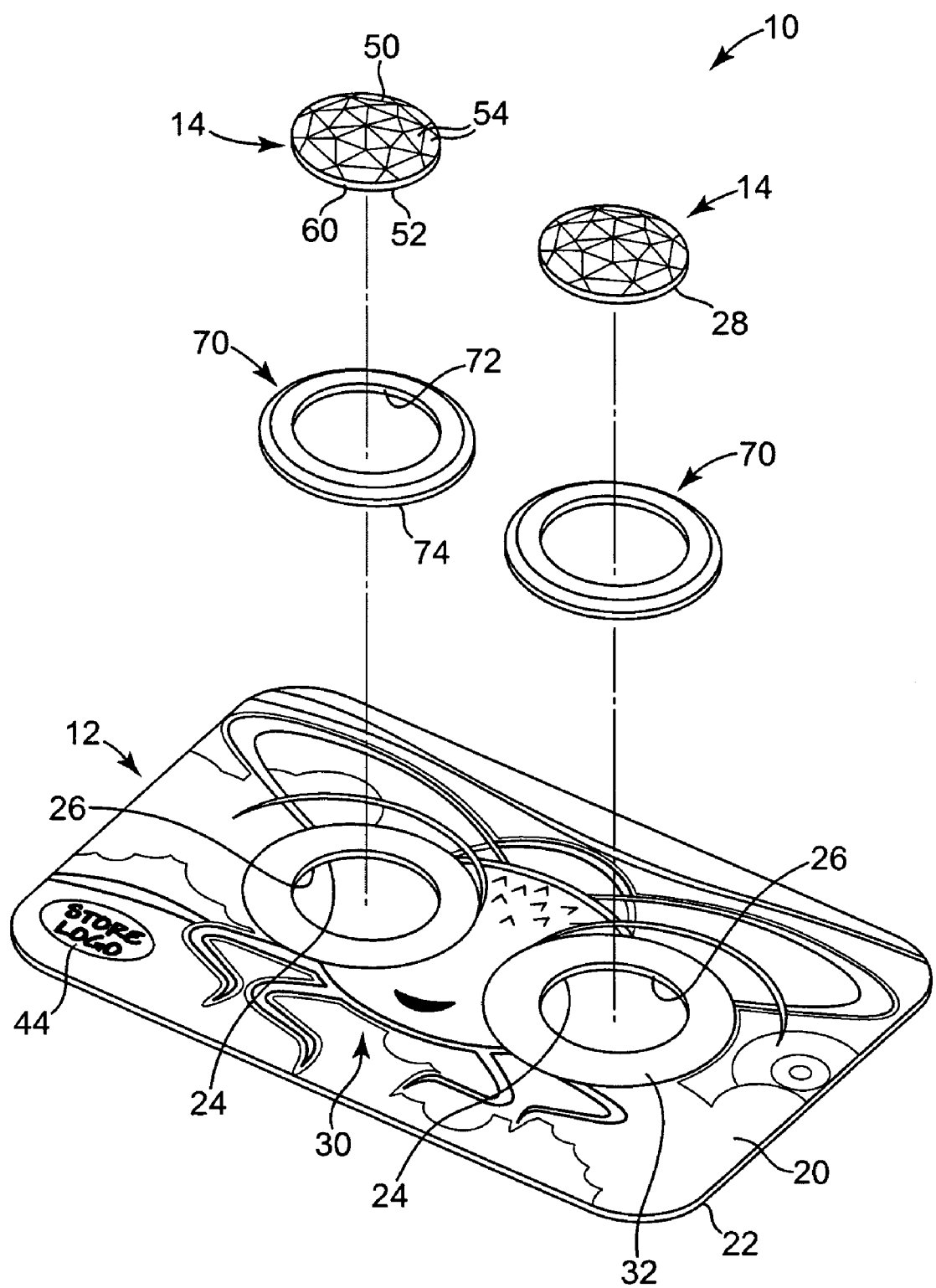
FIG. 1 is an exploded perspective view illustration of a stored-value card, according to one embodiment of the present invention.
Figure 2:
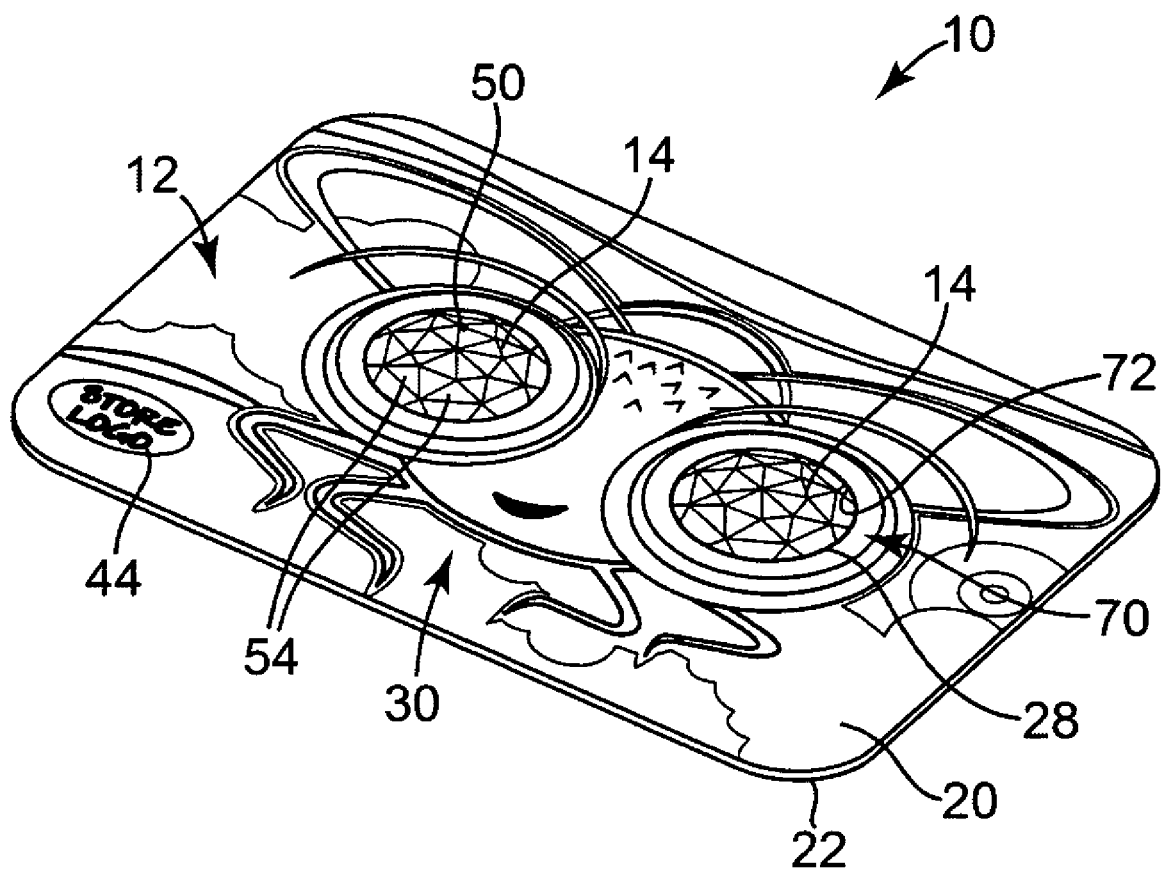
FIG. 2 is a perspective view illustration of a stored-value card, according to one embodiment of the present invention.
Figure 3:
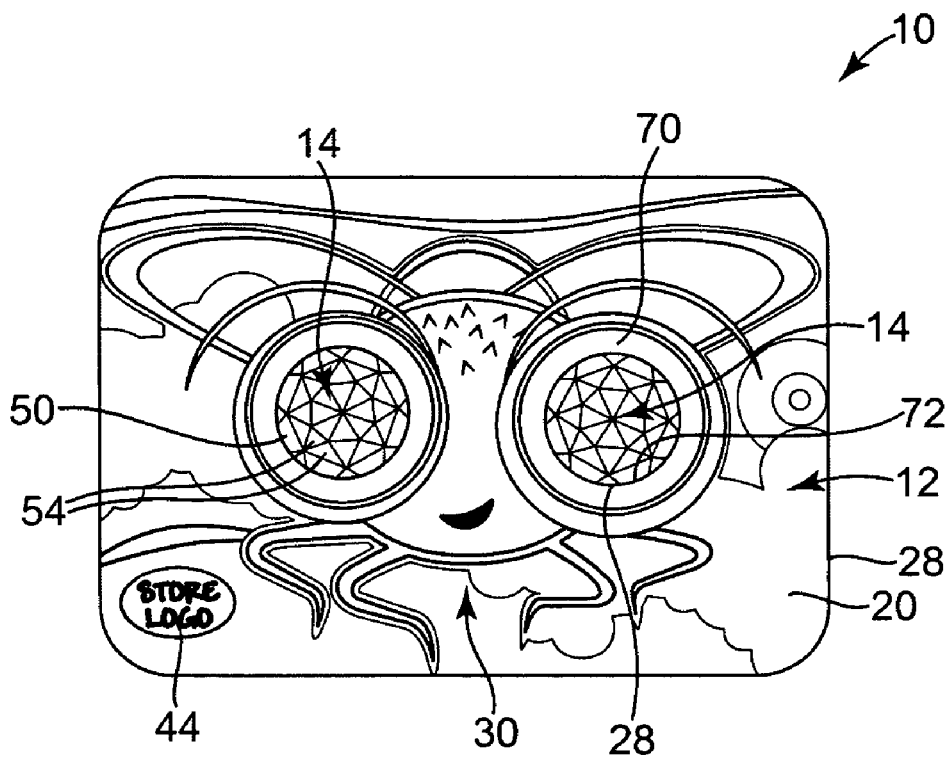
FIG. 3 is a front view illustration of the stored-value card of FIG. 2, according to one embodiment of the present invention.

A stored-value card or other financial transaction card is adapted for making purchases of goods and/or services at, for example, a retail store or website. According to one embodiment, an original consumer buys a stored-value card to give a recipient who in turn is able to use the stored-value card at a retail store or setting to pay for goods and/or services. A stored-value card, according to embodiments of the present invention, provides the consumer and recipient with extra amusement in addition to the ability to pay for goods and/or services with the stored-value card.

In particular, the stored-value card includes at least one translucent or transparent visual distortion member included therein. The visual distortion member(s) are positioned such that a card bearer can look through the visual distortion member(s) and, as a result, will have her vision distorted such that the appearance of the subject being viewed is altered to the viewer through the visual distortion member(s). In one embodiment, the visual distortion member(s) are configured to distort the bearer's vision with multiple lens surfaces. In one example, such distortion is reminiscent of the vision of an insect having a compound eye, e.g., a fly, and a fly or other insect character is illustrated on the stored-value card such that the vision distortion member(s) are positioned to appear as one or more eyes of the depicted fly character. In one embodiment, this amusing aspect of the stored-value card promotes the sale, use, and/or loading of the stored-value card by potential consumers and/or bearers of the stored-value card.

Turning to the figures, FIGS. 1-6 illustrate various views of one embodiment of a stored-value card 10, which includes a substrate 12 and a visual distortion member 14. In general, visual distortion member 14 is positioned adjacent substrate 12 such that a card bearer can view subjects through visual distortion member 14. In one embodiment, visual distortion member 14 is at least partially embedded within or surrounded by substrate 12. For example, substrate 12 extends at least partially around and is coupled with visual distortion member 14 about a boundary 16 (FIG. 4) therebetween.

Substrate 12 defines a first surface 20, a second surface 22 opposite first surface 20, and at least one opening or aperture 24 (FIG. 1) extending therethrough. In one embodiment, at least one of first and second surfaces 20 and 22 is substantially planar. Each aperture 24 is sized and shaped to at least partially receive visual distortion member 14. More particularly, each aperture 24 defines an edge 26 sized and shaped to abut a least a portion of an outer perimeter edge 28 of visual distortion member 14 as will be further described below. In other embodiments, edge 26 and perimeter edge 28 may be overlapped or otherwise positioned relative to one another.

In one embodiment, substrate 12 is generally rectangular in shape and is of a size similar to that of an identification card, a credit card, or other card sized to fit in a wallet of a card bearer (i.e. wallet sized). In particular, in one embodiment, substrate 12 is about 8.5 cm long, about 5.5 cm wide, and less than about 1 mm thick. In other embodiments, substrate 12 is otherwise shaped as a square, circle, oval, star, or any other suitable shape.

Substrate 12 is formed of a somewhat rigid yet flexible material similar to that commonly used for identification cards, credit cards, etc. More specifically, in one embodiment, substrate 12 is formed of paper, cardstock, plastic, e.g. polycarbonate, polystyrene, or polyvinyl chloride (PVC), or other suitable material. In one embodiment, substrate 12 is formed of injected molded plastic or cut from sheet-stock plastic material. Substrate 12 can be formed in any other suitable planar or non-planar configuration as will be apparent to those of skill in the art upon reading this application.

In one embodiment, substrate 12, for example, first surface 20 of substrate 12, includes a graphical depiction of an object 30. Object 30 may be an inanimate article, a character such as an animal, toy, person, fictional being (for example, a cartoon character or other fictional character), or other suitable object. As such, substrate 12 with object 30 depicted thereon is one example of means for depicting a subject or character. In one example, object 30 is a character, more specifically a depiction of a fly, and the at least one aperture 24 extends through or is positioned adjacent a portion 32 (FIG. 1) of object 30 relating to an eye of depicted object 30. In one example, the at least one aperture 24 is two apertures, each aperture being positioned to correspond with an expected position of a different eye of object 30. In one example, each aperture 24 defines a diameter of at least 1.5 cm.

Figure 4:
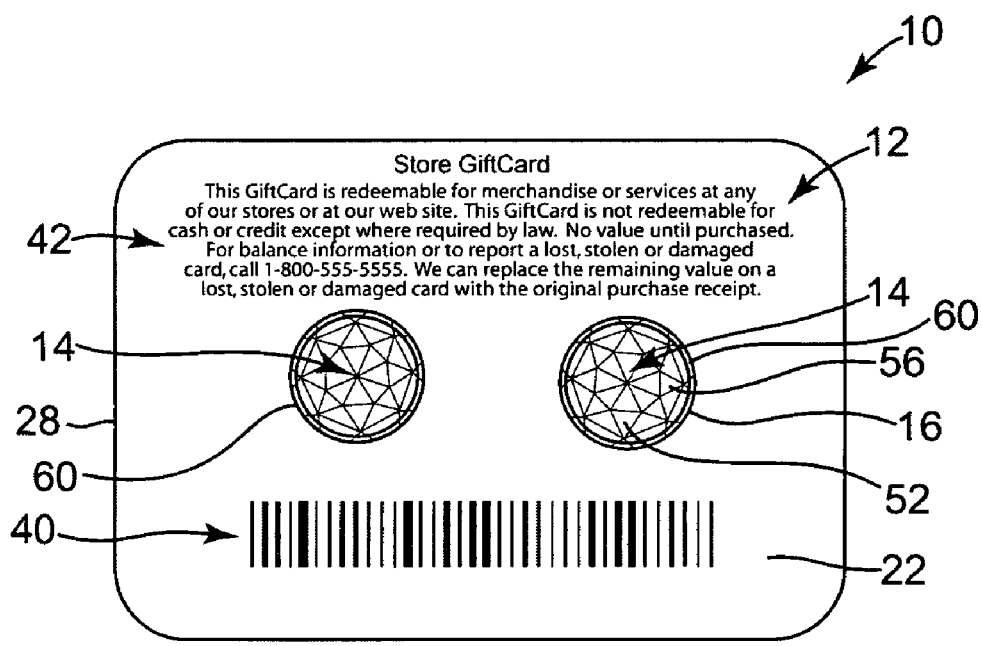
FIG. 4 is a rear view illustration of the stored-value card of FIG. 2, according to one embodiment of the present invention.

Referring to the rear view illustration of FIG. 4, substrate 12 or other portion of stored-value card 10 includes an account identifier 40, such as a barcode, a magnetic strip, a smart chip or other electronic device, a radio frequency identification (RFID) device, or other suitable identifier readily readable by a point-of-sale terminal, account access station, kiosk, or other suitable device. More particularly, in one embodiment, account identifier 40 is printed on or otherwise applied to second surface 22 of substrate 12. Account identifier 40 indicates a financial account or record to which stored-value card 10 is linked. The financial account or record of the monetary balance on stored-value card 10 optionally is maintained on a database, other electronic or manual record-keeping system, or, in the case of "smart" cards for example, on a chip or other electronic device on/in stored-value card 10 itself. Accordingly, by scanning account identifier 40, a financial account or record linked to stored-value card 10 is identified and can subsequently be activated, have amounts debited therefrom, and/or have amounts credited thereto. Account identifier 40 is one example of means for linking stored-value card 10 with a financial account or a financial record.

In one embodiment, redemption indicia 42 are included on stored-value card 10 such as on second surface 22 of substrate 12. Redemption indicia 42 indicate that stored-value card 10 is redeemable for the purchase of goods and/or services and that, upon use, a value of the purchased goods and/or services will be deducted from the financial account or record linked to stored-value card 10. In one embodiment, redemption indicia 42 include phrases such as "<NAME OF STORE> GiftCard" and "This GiftCard is redeemable for merchandise or services at any of our stores or at our website," and/or provides help or phone line information in the case of a lost, stolen, or damaged stored-value card, etc. In one embodiment, other indicia 44 are also included on first or second surfaces 20 and 22 including other objects, texts, backgrounds, graphics, brand or store identifiers, etc.

In one embodiment, stored-value card 10 includes brand indicia 44 disposed on stored-value card 10 as one example of means for associating stored-value card 10 with at least one of a product, a brand, a store, a holiday, a season, an occasion, a media format, e.g. characters, logos, scenes, or other illustrations or photographs related to at least one of a movie, television show, book, video game, etc. Other indicia or additionally features may also be included on stored-value card 10 as will be apparent to those of skill in the art upon reading this application. In addition, in one example, any one or more of indicia 42 and 44 may not be included on substrate 12 or stored-value card 10 as a whole.

Each visual distortion member 14 is any suitable translucent or transparent member configured to distort the vision of any individual looking through visual distortion member 14. In one embodiment, each visual distortion member 14 is any lens configured to bend or any other means for bending light to distort or otherwise alter the appearance of any given subject viewed through a visual distortion member(s) 14. Visual distortion member(s) 14 each define a front side 50 and a rear side 52 (FIG. 4) opposite front side 50.

In one embodiment, front side 50 of each visual distortion member 14 is formed similar to a geodesic dome (e.g., a domed or vaulted structure of substantially planar, interlocking polygonal elements) and, as such, defines a plurality of polygonal surfaces 54. In one embodiment, the plurality of surfaces 54 may be each at least partially one of triangular, hexagonal, pentagonal, quadrangular, or other suitable shape for collectively forming a dome-like structure in a multi-faceted manner. In one example, more than ten surfaces 54 (or otherwise stated, more than ten facets) are included on front side 50 of each visual distortion member 14. In one embodiment, rear side 52 generally defines a curved and relatively smooth rear surface 56 (generally indicated in FIG. 4). In one example, visual distortion member 14 is substantially solid between front and rear sides 50 and 52.

In this manner, a card bearer looking through visual distortion member 14 from rear side 52 looks through smooth rear surface 56 and at least a portion of the plurality of surfaces 54. In this manner, the viewer, e.g. the card bearer, viewing a single subject (or portion thereof) through visual distortion member 14 is presented with a plurality of subject images rather the one subject-to-one image ratio of normal human vision. As such, the plurality of surfaces 54 causes visual distortion member 14 to present the viewer with an image to mimic that which would be seen with a compound eye such as that of a fly or other insect. Notably, visual distortion member 14 may define or mimic a compound eye having any multiple number of surfaces 54, which create any number of image replications.

As described above, each visual distortion member 14 defines outer perimeter edge 28. In one example, perimeter edge 28 extends between and around an outer portion of the collective plurality of surfaces 54 and smooth rear surface 56. In one embodiment, perimeter edge 28 extends from the plurality of surfaces 54 beyond smooth rear surface 56 so as to define a flange 60 (FIG. 4), as will be further described below, extending around the remainder of visual distortion member 14 to increase the overall thickness of perimeter edge 28. Visual distortion member 14 may be formed of any suitable material such as a plastic, acrylic, or other material.

During assembly, each visual distortion member 14 is positioned such that perimeter edge 28 at least partially abuts an edge 26 of a corresponding aperture 24 defined by substrate 12. In one embodiment, each aperture 24 and each perimeter edge 28 are each generally circular such that visual distortion member 14 is positioned within aperture 24 such that substrate 12 generally surrounds each visual distortion member 14 to form boundary 16 there between as a closed boundary.

Figure 5:
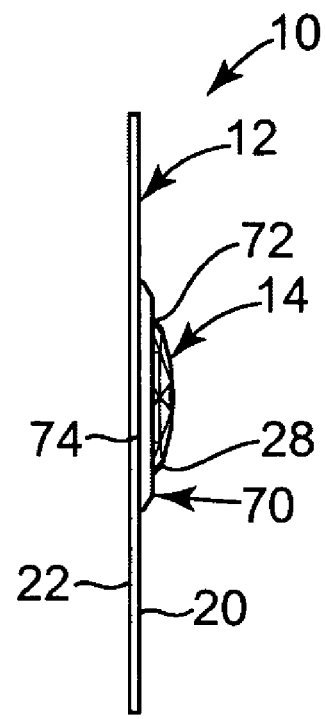
FIG. 5 is a left side view illustration of the stored-value card of FIG. 2, according to one embodiment of the present invention, the right side view being a mirror image thereof.
Figure 6:
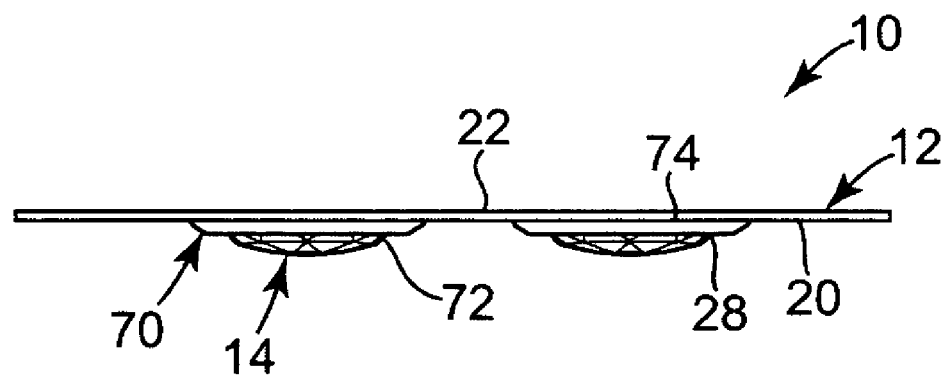
FIG. 6 is a top view illustration of the stored-value card of FIG. 2, according to one embodiment of the present invention, the bottom view illustration being a mirror image thereof.

Perimeter edge 28 is coupled with edge 26 in any suitable manner. In one example, perimeter edge 28 is ultrasonically welded to edge 26. In one embodiment, each of perimeter edge 28 and edge 26 are generally smooth and are characterized by the absence of notches, grooves, or other similar features. In one instance, upon assembly, dome-like front side 50 extends forward beyond first surface 20 of substrate 12 as generally illustrated in FIGS. 5 and 6.

With the above assembly in mind, in one embodiment, where each aperture 24 is positioned to correspond with a particular portion of object 30, such as the eyes of a fly object 30, visual distortion member 14 is positioned to appear as the particular portion, e.g., as the eyes, of object 30 as will be apparent to those of skill in the art upon reading this application. In addition, upon reading this application, other depictions of objects 30 and locations and numbers of apertures 24 and corresponding objects 30 will be apparent to those of skill in the art. For example, the depicted object 30 may be a character including glasses and the aperture(s) 24 may be positioned to correspond with the lens(es) of the glasses, etc. In one embodiment, object 30 is inanimate, e.g., a looking glass and/or similar member, depicted such that aperture(s) 24 are positioned where a lens, window, etc. would be expected to be positioned.

In one embodiment, in order to further strengthen the connection of visual distortion member 14 with substrate 12, ring or rim 70 may be provided for each visual distortion member 14 provided. In one embodiment, each rim 70 is formed of a plastic, acrylic, or other suitable material. Rim 70 defines an inside surface 72, e.g., an inside surface, that is sized similar to edge 26 of opening and is configured to abut at least a portion of flange 60, more specifically, perimeter edge 28 of visual distortion member 14. In one embodiment, rim 70 radially extends with a width such that an outside diameter is defined that is larger than an inside dimension defined by inside surface 72. In this manner, rim 70 also defines a rear, generally planar surface 74 that extends between the inside and outside diameters of rim 70. In one embodiment, rear surface 74 extends substantially perpendicularly to inside surface 72.

In one example, during assembly, rim 70 is coupled with both substrate 12 and visual distortion member 14 in any suitable manner such as with ultrasonic welding, adhesive, etc. In particular, edge 72 of rim 70 is coupled with perimeter edge 28 of visual distortion member 14, and rear surface 74 is aligned and coupled with first surface 20 of substrate 12. The inclusion of rim 70 thereby increases the strength of the coupling between visual distortion member 14 and substrate 12. In one embodiment, a height/thickness of edge 26 added to a height/thickness of surface 72 is collectively similar to a height/thickness of perimeter edge 28 defined at least partially by flange 60 of visual distortion member 14. In one embodiment, upon assembly, dome-like front side 50 extends further forward (i.e. outward from first surface 20) than rim 70 as generally illustrated in FIGS. 5 and 6.

Figure 7:
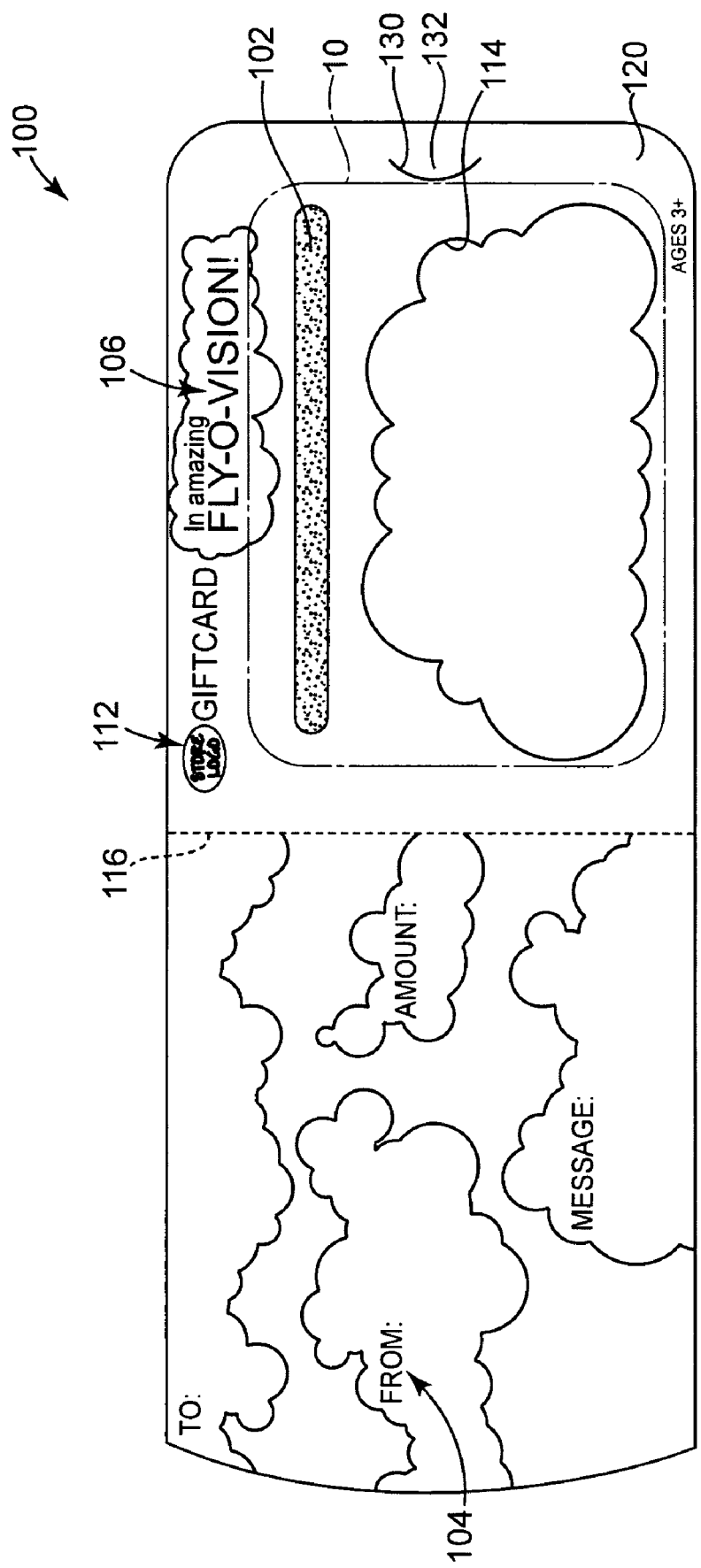
FIG. 7 is a front view illustration of an unfolded backer for a stored-value card, according to one embodiment of the present invention.
Figure 8:
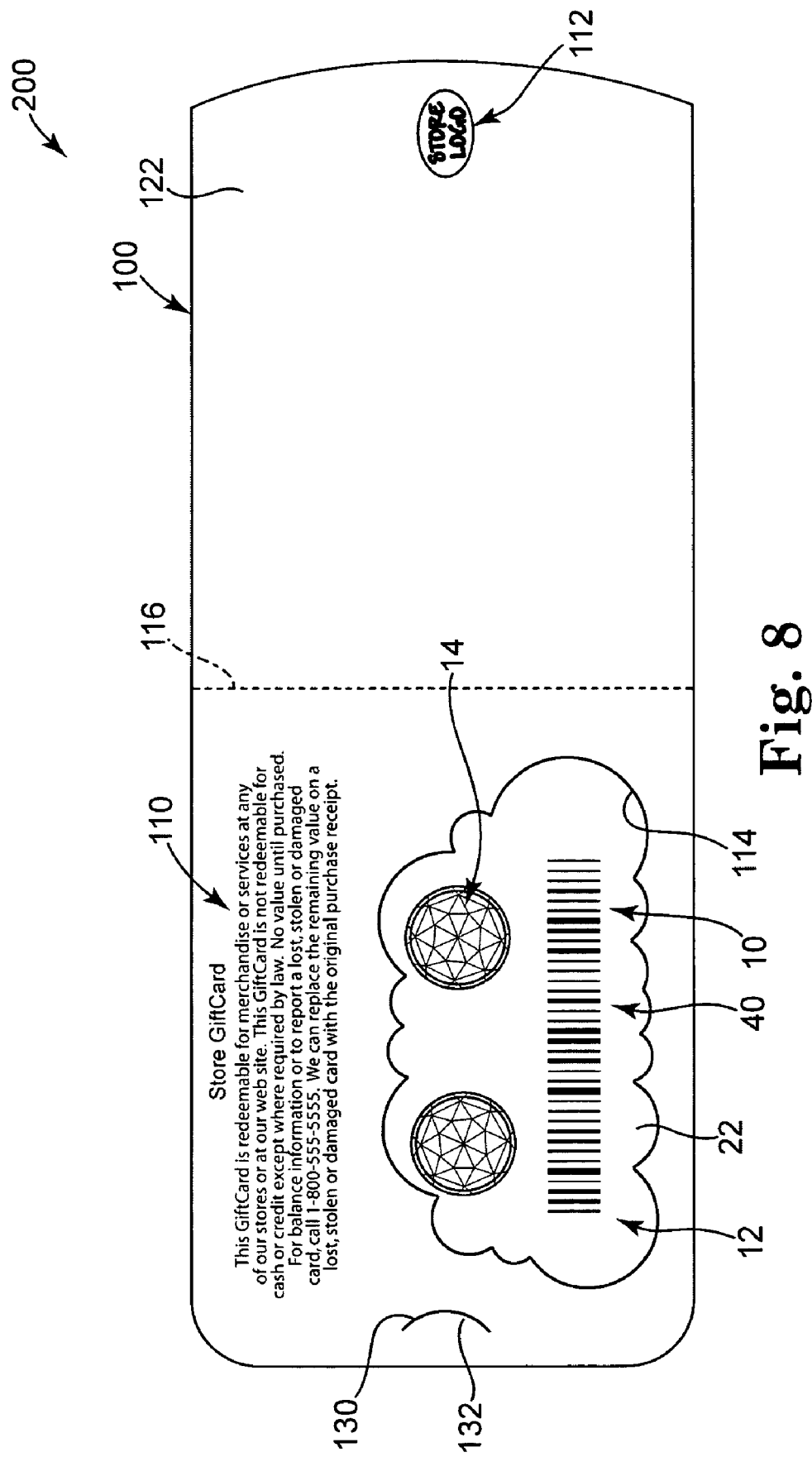
FIG. 8 is a rear view illustration a stored-value card assembly including the unfolded backer of FIG. 7 with the stored-value card of FIG. 2, according to one embodiment of the present invention.

FIGS. 7 and 8 illustrate a carrier or backer 100 for supporting stored-value card 10. Stored-value card 10, which is represented in phantom lines in FIG. 7 for illustrative purposes so as to not obstruct backer 100, is readily releasably attached to backer 100, for example by a removable adhesive 102 or the like. Backer 100 and stored-value card 10 collectively define a stored-value card assembly 200 (FIG. 8). Backer 100 comprises a single layer or multiple layers of paper or plastic material, for example, generally in the form of a relatively stiff but bendable/flexible card. Use of other materials is also contemplated. Backer 100 displays indicia, graphics or text information including store logo(s), store name(s), slogans, advertising, instructions, directions, brand indicia, promotional information, holiday indicia, seasonal indicia, media format identifiers, characters, and/or other information.

For example, indicia 104 include to, from, amount, and message fields. The fields of indicia 104 provide areas of backer 100 configured to be written upon by a consumer to personalize backer 100 for presentation as a gift to a particular recipient, for a particular purpose, and/or to indicate a value of stored-value card 10.

In one example, indicia 106 promote that stored-value card 10 includes visual distortion member(s) 14. In one instance, indicia 106 state "In amazing FLY-O-VISION!" In one example, indicia 106 additionally instruct the bearer of stored-value card 10 on how to use stored-value card 10 for amusement.

Referring to FIG. 8, in one embodiment, indicia 110 indicate that stored-value card 10 is redeemable for the purchase of goods and/or services and that upon use, a value of the purchased goods and/or services will be deducted from the financial account or record linked to stored-value card 10. In one embodiment, indicia 110 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc.

Brand indicia 112 may also or alternatively be included to identify a store, brand, department, etc. and/or services associated with stored-value card 10. Any of indicia 42 (e.g., FIG. 4), 44 (e.g., FIG. 2), 104, 106, 110, 112, or other indicia optionally may appear anywhere on backer 100 or stored-value card 10. Additional information besides that specifically described and illustrated herein may also be included and/or one or more of indicia 42, 44, 104, 106, 110, and 112 may be eliminated.

Backer 100 includes a window or opening 114 for displaying account identifier 40 of stored-value card 10 therethrough as illustrated in FIG. 8. As previously described, account identifier 40 is adapted for accessing a financial account or a financial record associated with stored-value card 10 for activating, loading, or debiting from the financial account or financial record. Accordingly, opening 114 allows viewing or other access to account identifier 40 to activate and/or load stored-value card 10 without removing stored-value card 10 from backer 100. In one embodiment, a portion of backer 100 alternatively is configured to be folded away from the remainder of backer 100 to access account identifier 40 without removing stored-value card 10 from backer 100.

In one example, opening 114 is positioned and sized such that visual distortion member(s) 14 are viewable through opening 114. In this manner, even when stored-value card 10 is coupled with backer 100, the bearer of stored-value card 10 can look through opening 114 and through visual distortion member(s) 14. In one embodiment, so positioning stored-value card 10 on backer during display of stored-vale card 10 is configured to further promote purchase of stored-value card 10.

In one embodiment, backer 100 is a bi-fold substrate defining a fold line 116, 5 about which backer 100 is foldable roughly in half. In FIGS. 7 and 8, backer 100 is unfolded, i.e. is in an open configuration. According to one embodiment, FIG. 7 illustrates inside surfaces 120 of backer 100 that will be supported on a rack or other fixture to be visible to a consumer of a retail store who is considering the purchase of stored-value card 10. In another example, while on display in a retail store, backer 100 is folded back about fold line 116 to present only portions of inside surfaces 120 of backer 100, i.e., surfaces illustrated in FIG. 7, that are positioned on the same side of fold line 116 as stored-value card 10 to a consumer. In such an embodiment, indicia 104 would not be visible to a consumer when backer 100 and stored-value card 10 are placed for display in a retail store. Backer 100 is one example of means for supporting stored-value card 10 for display in a retail setting.

After purchase, backer 100 is foldable about fold line 116 such that the FIG. 7 inside surfaces 120 of backer 100 are folded toward each other and stored-value card 10 is enclosed or wrapped in a compact package formed by foldable backer 100. In this manner, outer surfaces 122 of backer 100, i.e., the surfaces illustrated in FIG. 7, are disposed toward the outside of the folded, compact package, according to embodiments of the invention. In one embodiment, folded backer 100 effectively wraps stored-value card 10 for presentation from a consumer to a recipient. Folding backer 100 in the other direction about fold line 116 for display on a rack in a retail setting, or about other fold lines of backer 100 is also contemplated. In one embodiment, although described above and depicted in FIGS. 7 and 8 as a single fold line 116, fold line 116 may be one of a plurality of fold lines (not shown) so as to accommodate various thickness of or to otherwise wrap stored-value card 10 as will be apparent to those of skill in the art upon reading this application.

In one embodiment, a cut 130 is formed through backer 100 near an edge of backer 100 spaced from and substantially parallel to fold line 116. Cut 130 extends partially toward fold line 116 and defines a flap 132, which can be partially bent away from the remainder of backer 100. More specifically, upon folding of backer 100 about fold line 116 to close backer 100 around stored-value card 10, an opposing edge of backer 100 is tucked beneath flap 132 to maintain backer 100 in a folded or closed position. In one embodiment, cut 130 and thereby flap 132 are each substantially semi-circular in shape. Other backers similar to backer 100 can be used having various sizes and shapes for supporting stored-value card 10.

Figure 9:
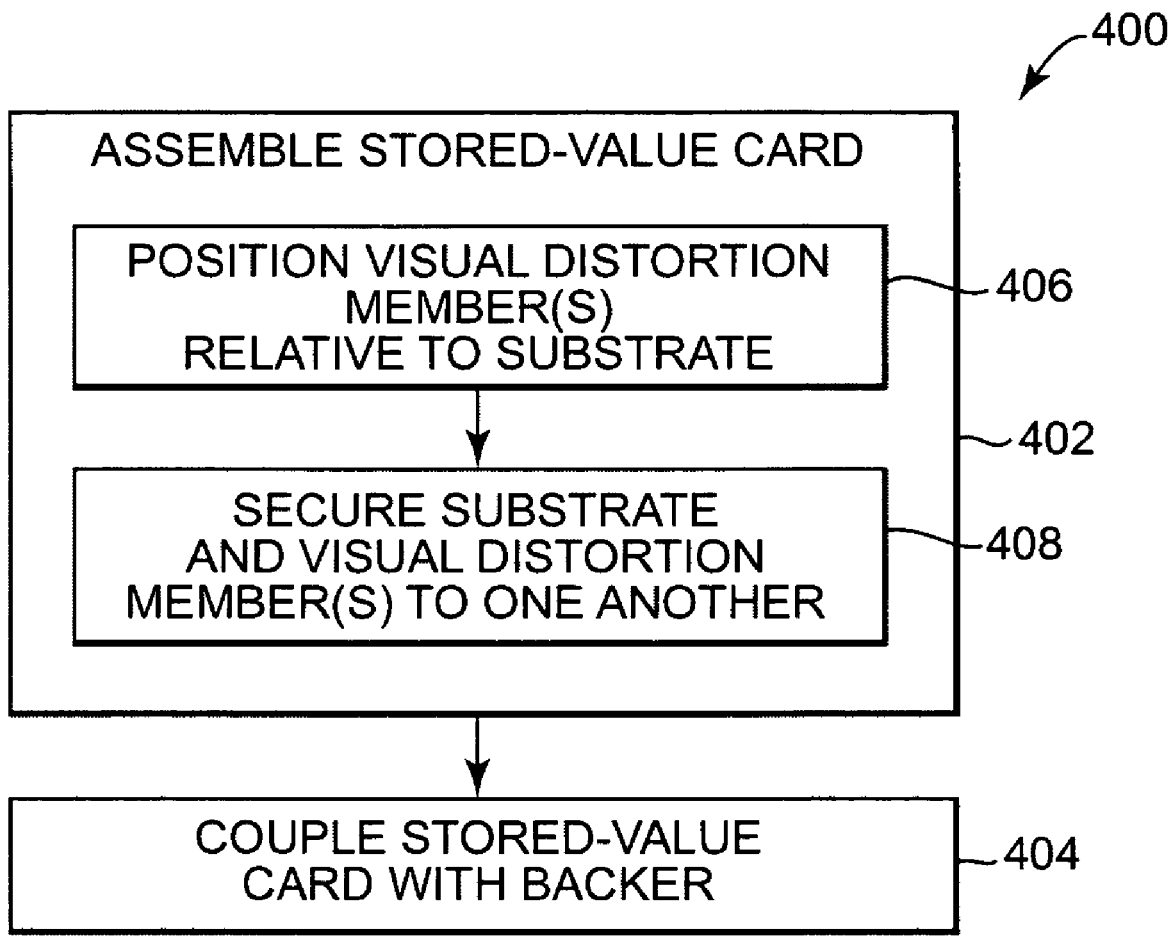
FIG. 9 is a flow chart illustrating a method of assembling a stored-value card assembly, according to one embodiment of the present invention.

FIG. 9 is a flow chart illustrating one embodiment of a method 400 of assembling stored-value card assembly 200 (FIG. 8) and is described with particular reference to stored-value card 10 of FIG. 1 and backer 100 of FIGS. 7 and 8. At 402, stored-value card 10 is assembled and, at 404, stored-value card 10 is coupled with backer 100 to form stored-value card assembly 200. In one embodiment, assembly at 402, includes two operations 404 and 408. In particular, at 404, visual distortion member(s) 14, in particular, perimeter edge(s) 28 thereof, are each aligned with and positioned relative to substrate 12, in particular, with edge 26 of a respective aperture 24. More specifically, each perimeter edge 28 is positioned to abut inside edge 26 of a corresponding aperture 24.

Subsequently, at 408, perimeter edge 28 of each visual distortion member 14 is coupled, for example, is ultrasonically welded, to inside edge 26 of the corresponding aperture 24. In one example, operation 408 includes additionally providing rim(s) 70. For instance, each rim 70 is placed around a corresponding visual distortion member 14 such that inside surface 72 abuts perimeter edge 28 thereof and rear surface 72 abuts substrate 12. Accordingly, rim(s) 70 are ultrasonically welded or otherwise coupled to each of substrate 12 and a corresponding visual distortion member 14. Although described above as being added as part of operation 408, in one embodiment, each rim 70 is coupled with a corresponding visual distortion member 14 prior to either operation 406 or 408. For example, each rim 70 may be coupled with a corresponding visual distortion member 14, such that each rim 70 facilities subsequent alignment and positioning of the corresponding visual distortion member 14 with the respective aperture 24 of substrate 12 or vice versa. In one embodiment, rim(s) 70 are eliminated.

At 404, the assembled stored-value card 10 is coupled with backer 100 (FIGS. 7 and 8) to form stored-value card assembly 200. In one example, stored-value card 10 is coupled to backer 100 with adhesive 102 (FIG. 7) or other selectively releasable material or device. Once stored-value card 10 is coupled to backer 100, account identifier 40 and, in one embodiment, visual distortion member(s) 14 are viewable through window 114 of backer 100. In one embodiment, backer 100 is folded into a folded position for shipment and/or display to retail settings. Backer 100 is, more specifically, folded by folding backer 100 about fold line 116 such that outer surfaces 122 illustrated in FIG. 8 are moved toward each other. As such, a portion of backer 100 with stored-value card 10 is visible from one side of folded backer 100. Backer 100 can also be folded in the opposite direction about fold line 116 to substantially enclose stored-value card 10. In one embodiment, backer 100 is displayed in position in which outer surfaces 122 are folded toward one another.

Figure 10:
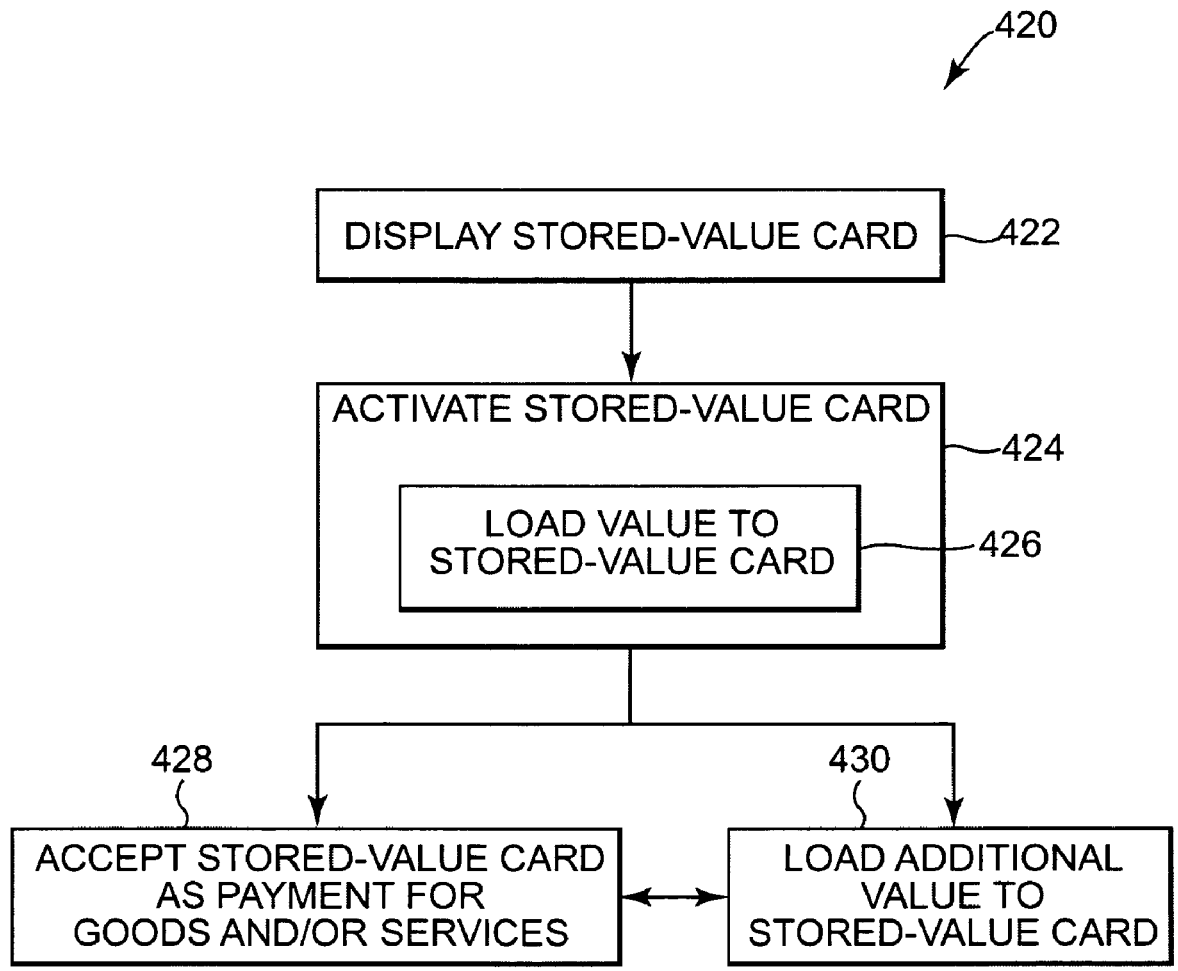
FIG. 10 is a flow chart illustrating a method of encouraging purchase and facilitating use of a stored-value card assembly, according to one embodiment the present invention.

FIG. 10 is a flow chart illustrating one embodiment of a method 420 of encouraging purchase and facilitating use of stored-value card 10 by consumers. At 422, stored-value card 10 is placed or hung from a rack, shelf, or other similar device to display stored-value card 10 for sale to potential consumers. In one example, stored-value card 10 is placed for retail sale when assembled to backer 100 as part of stored-value card assembly 200. In one embodiment, a depiction of stored-value card 10 is placed on a website for viewing and purchase by potential consumers. In one example, backer 100 is configured to display stored-value card 10 such that one can look through visual distortion member(s) 14 of stored-value card 10 through or around portions of backer 100. In this manner, backer 100 does not impede one from looking through visual distortion member(s) 14, which in turn serves to promote the amusing aspect of stored-value card 10, which thereby, promotes purchase of stored-value card 10. In one embodiment, stored-value card 10 is displayed without backer 100.

At 424, a consumer who has decided to purchase stored-value card 10 presents the stored-value card 10 on backer 100 to a retail store employee, retail store kiosk, remote terminal, or other person or device to scan account identifier 40 to access a financial account or financial record linked to account identifier 40. In particular, account identifier 40 is scanned or otherwise accessed, for example through window 114 of backer 100 to activate stored-value card 10. Upon accessing the financial account or financial record, then, at 426, value is added to the financial account or financial record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website. In one embodiment, where stored-value card 10 is displayed on a website at 422, then, at 424, stored-value card 10 may be activated in any suitable method and may not require the physical scanning of account identifier 40 to be activated or to otherwise access the associated financial account or record such as at 426.

At 428, the retail store or other affiliated retail setting or website accepts stored-value card 10 as payment towards the purchase of goods and/or services made by the current bearer of stored-value card 10. In particular, the value currently loaded on stored-value card 10 (i.e. stored or recorded in the financial record or account linked to account identifier 40) is applied towards the purchase of goods and/or services. At 430, additional value is optionally loaded on stored-value card 10 at a point of sale terminal, kiosk, or other area of the retail store or related setting. Upon accepting stored-value card 10 as payment at 428, the retail store or related setting can subsequently perform either operation 428 or operation 430 as requested by a current bearer of stored-value card 10. Similarly, upon loading additional value on stored-value card 10 at 430, the retail store or related setting can subsequently perform either operation 430 again or operation 428. In one example, the ability to accept stored-value card 10 as payments for goods and/or services is limited by whether the financial account or financial record associated with stored-value card 10 has any value stored or recorded therein at the time of attempted redemption.

Figure 11:
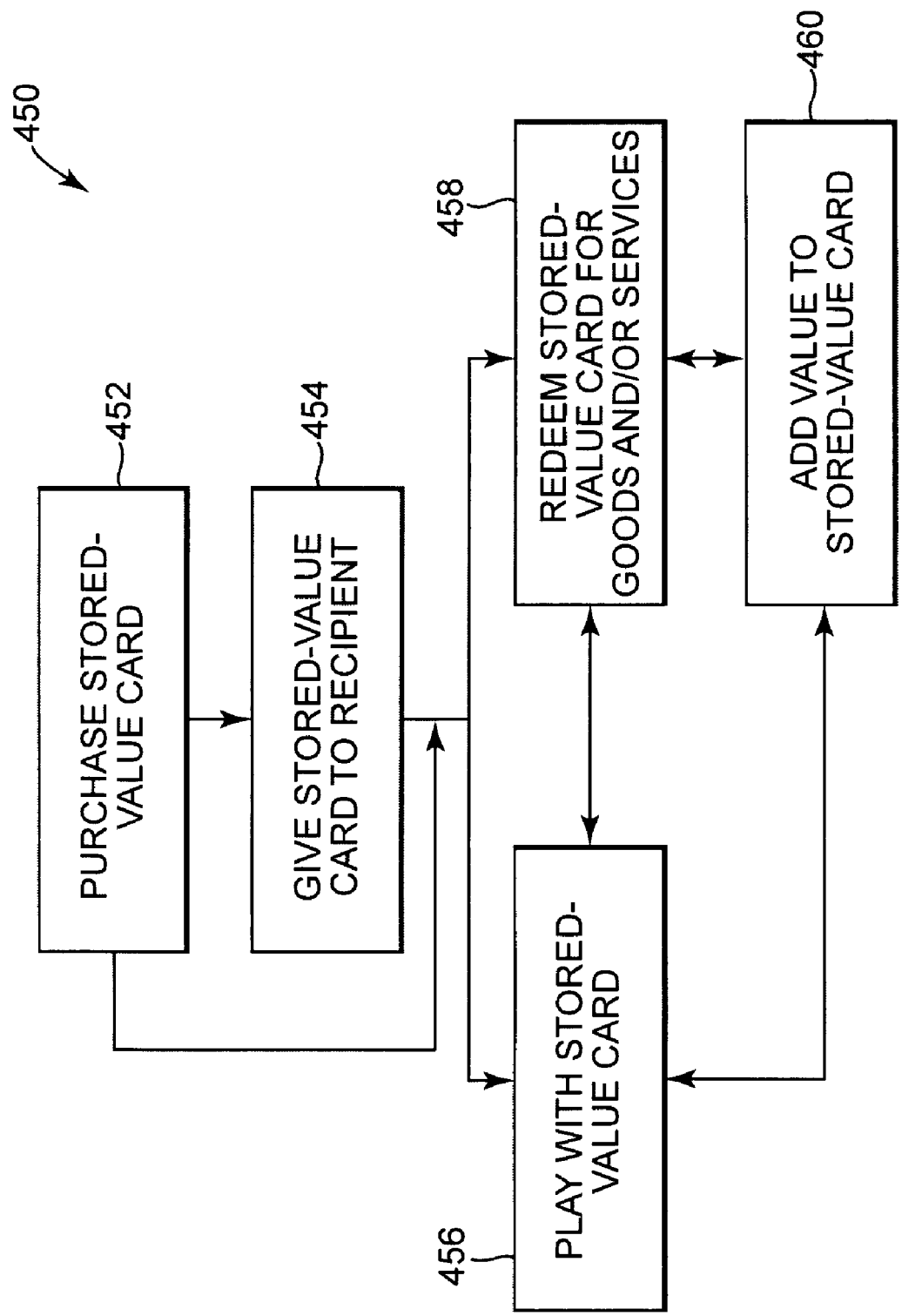
FIG. 11 is a flow chart illustrating a method of using a stored-value card assembly, according to one embodiment of the present invention.

FIG. 11 is a flow chart illustrating one embodiment of a method 450 of using stored-value card 10 (FIG. 1). At 452, a potential consumer of stored-value card 10, which is displayed in a retail store or viewed on a website, decides to and does purchase stored-value card 10 from the retail store or website. Stored-value card 10 can be displayed and purchased alone or as part of stored-value card assembly 200 (FIG. 8) along with backer 100. Upon purchasing a stored-value card 10, a retail store employee, a retail store kiosk, or other person or device scans account identifier 40 (FIG. 4) through window 114 of backer 100 or otherwise reads or accesses account identifier 40. Upon accessing account identifier 40, the financial account or record linked to account identifier 40 is accessed and activated to load value onto stored-value card 10. In one embodiment, such as where stored-value card 10 is purchased at 452 via a website, actual scanning of account identifier 40 may be eliminated.

At 454, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 454.

At 456, the consumer or recipient, whoever is in current ownership or otherwise is the current bearer of stored-value card 10, removes stored-value card 10 from backer 100 if stored-value card 10 is coupled with backer 100. The current bearer of stored-value card 10 can play with stored-value card 10 by looking through visual distortion member(s) 14 so as to present the bearer with a distorted view of objects viewed through visual distortion member(s) 14. As such, the card bearer is amused by stored-value card 10. In one embodiment, where visual distortion member(s) 14 can be viewed through backer 100, stored-value card 10 may be played with at 456 without removing stored-value card 10 from backer 100.

At 458, the current bearer of stored-value card 10 redeems stored-value card 10 for goods and/or services from the retail store or website. At 460, the current bearer of stored-value card 10 optionally adds value to stored-value card 10, and more particularly, to the financial account or financial record associated with stored-value card 10, at the retail store or over the Internet (i.e. via the website). Upon playing with stored-value card 10 at 456, redeeming stored-value card 10 at 458, or adding value to stored-value card 10 at 460, the current bearer of stored-value card 10 subsequently can perform any of operations 456, 458, or 460 as desired. In one embodiment, the ability of the current bearer to repeat redeeming stored-value card 10 at 458 is limited by whether the financial account or financial record associated with stored-value card 10 has any remaining value stored or recorded therein at the time of attempted redemption.

Although described above as occurring at a single retail store or website, in one embodiment, purchasing stored-value card 10 at 452, redeeming stored-value card 10 at 458, and adding value to stored-value card 10 at 460, can each be performed at any one of a number of stores adapted to accept stored-value card 10 or over the Internet. In one example, a number of stores are each part of a chain or similarly branded stores. In one example, a number of stores include at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a financial account or financial record associated with a stored-value card. The balance associated with the stored-value card declines as the card is used, encouraging repeat visits. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. For example, other stored-value card structures including movable graphic portions may be used. Other modifications within the scope of the invention and its various embodiments will be apparent to those of ordinary skill.

What is claimed is:

1. A financial transaction card comprising:
   a substrate defining an aperture and including an account identifier, the account identifier linking the financial transaction card to at least one of a financial account and a financial record; and
   a visual distortion member positioned at least partially within the aperture and coupled with the substrate, the visual distortion member being configured to distort images viewed therethrough;
   wherein a graphical depiction of an object is included on a first surface of the substrate, and the account identifier is included on a second, opposite surface of the substrate.

2. The financial transaction card of claim 1, wherein a front side of the visual distortion member includes a plurality of substantially planar surfaces arranged to collectively define a shape that is similar to a geodesic dome.

3. The financial transaction card of claim 2, wherein the plurality of substantially planar surfaces are each substantially triangular.

4. The financial transaction card of claim 2, wherein the plurality of substantially planar surfaces includes at least 10 surfaces.

5. The financial transaction card of claim 1, wherein the visual distortion member is configured to distort images viewed therethrough by presenting multiple views of a portion of a subject to mimic an effect of a compound eye.

6. The financial transaction card of claim 1, wherein the object is a character, and the visual distortion member is positioned relative to the character so as to appear as an eye of the character.

7. The financial transaction card of claim 6, wherein the character is a fly.

8. A financial transaction card comprising:
a substrate defining an aperture and including an account identifier, the account identifier linking the financial transaction card to at least one of a financial account and a financial record; and
a visual distortion member positioned at least partially within the aperture and coupled with the substrate, the visual distortion member being configured to distort images viewed therethrough;
wherein the aperture is one of two apertures, and the visual distortion member is one of two visual distortion members, each aperture having a corresponding one of the two visual distortion members.

9. The financial transaction card of claim 8, wherein each of the two apertures is positioned relative to the substrate to appear as a portion of an object depicted on the substrate.

10. A financial transaction card comprising:
a substrate defining an aperture and including an account identifier, the account identifier linking the financial transaction card to at least one of a financial account and a financial record;
a visual distortion member positioned at least partially within the aperture and coupled with the substrate, the visual distortion member being configured to distort images viewed therethrough; and
a rim extending around the visual distortion member and coupled with the substrate and the visual distortion member.

11. A combination comprising:
a financial transaction card comprising:
a substrate defining an aperture and including an account identifier, the account identifier linking the financial transaction card to at least one of a financial account and a financial record, and
a visual distortion member positioned at least partially within the aperture and coupled with the substrate, the visual distortion member being configured to distort images viewed therethrough; and
a backer configured to wrap the financial transaction card and defining a window, wherein the financial transaction card is coupled to the backer such that the account identifier is viewable through the window.

12. The combination of claim 11, wherein the window is sized and shaped such that the visual distortion member is viewable through the window.

13. A stored-value card comprising:
means for defining an overall shape of the stored-value card;
multifaceted means for viewing objects therethrough, the multifaceted means being embedded within the means for defining the overall shape of the stored-value card; and
means for linking the stored-value card to a financial account or record;
wherein the means for defining the overall shape of the stored-value card includes a depiction of a character, and wherein the multifaceted means is positioned relative to the character so as to appear as one or more eyes of the character.

14. The stored-value card of claim 13, wherein the means for linking is included on the means for defining the overall shape of the stored-value card opposite the depiction of the character.

15. A stored-value card comprising:
means for defining an overall shape of the stored-value card;
multifaceted means for viewing objects therethrough, the multifaceted means being embedded within the means for defining the overall shape of the stored-value card;
means for linking the stored-value card to a financial account or record; and
means for coupling the multifaceted means to the means for defining the overall shape of the stored-value card, the means for coupling being formed separately from the multifaceted means and the means for defining the overall shape of the stored-value card.

16. A combination comprising:
a stored-value card comprising:
means for defining an overall shape of the stored-value card,
multifaceted means for viewing objects therethrough, the multifaceted means being embedded within the means for defining the overall shape of the stored-value card, and
means for linking the stored-value card to a financial account or record; and
means for supporting the stored-value card for display in a retail setting, wherein the means for supporting includes means for permitting access to the means for linking and the multifaceted means through the means for supporting.

17. A method of encouraging purchase and facilitating use of a financial transaction card, the method comprising:
displaying a financial transaction card including an account identifier linking the financial transaction card to a financial account or record, the financial transaction card including at least one of a translucent member and a transparent member embedded within a substrate, wherein the at least one of the translucent member and the transparent member is configured to form multiple images of subjects viewed therethrough; and
activating the financial transaction card to permit deductions from the financial account or record.

18. The method of claim 17, further comprising receiving the financial transaction card as payment for goods or services, at least a portion of a value of the goods or services being deducted from the financial account or the financial record.

19. The method of claim 17, wherein displaying the financial transaction card includes displaying the financial transaction card coupled to a backer such that the backer supports the financial transaction card while on display, and wherein the account identifier and the at least one of the translucent and the transparent member are visible through an opening in the backer.

* * * * *